United States Patent [19]

Vachon

[11] Patent Number: 4,591,996
[45] Date of Patent: May 27, 1986

[54] APPARATUS AND METHOD FOR DETERMINING STRESS AND STRAIN IN PIPES, PRESSURE VESSELS, STRUCTURAL MEMBERS AND OTHER DEFORMABLE BODIES

[76] Inventor: Reginald I. Vachon, P.O. Box 1182, Atlanta, Ga. 30301

[21] Appl. No.: 767,663

[22] Filed: Aug. 21, 1985

Related U.S. Application Data

[63] Continuation of Ser. No. 264,445, May 18, 1981, abandoned.

[51] Int. Cl.$^4$ .............................................. G01B 11/16
[52] U.S. Cl. .................. 364/508; 356/35.5; 356/360; 73/800
[58] Field of Search ............... 364/506, 507, 508, 525, 364/550, 551, 552; 358/106, 107; 73/800; 356/32, 35.5, 345, 354, 355, 359, 360

[56] References Cited

U.S. PATENT DOCUMENTS

| | | | |
|---|---|---|---|
| 3,828,126 | 8/1974 | Ramsey, Jr. | 358/106 |
| 3,844,659 | 10/1974 | Baganoff | 356/32 |
| 3,889,053 | 6/1975 | Lloyd et al. | 358/106 |
| 4,018,531 | 4/1977 | Leendertz | 356/32 |
| 4,195,929 | 4/1980 | Raftopoulos et al. | 356/32 |
| 4,280,764 | 7/1981 | Sica, Jr. et al. | 356/35.5 |
| 4,288,852 | 9/1981 | Holland | 364/508 |
| 4,320,462 | 3/1982 | Lund et al. | 364/525 |
| 4,322,162 | 3/1982 | McKelvie et al. | 356/35.5 |
| 4,352,565 | 10/1982 | Rowe et al. | 356/360 |

OTHER PUBLICATIONS

"Noncontact Method of In-Plane Strain Measurement On Rotating Structures" by Preater; SPIE vol. 236, 1980, European Conference on Optical Sys. & Applications; pp. 58-62.

"Stress Analysis of In-Plane Vibration of 2-D Structure by a Laser Speckle Method" by Chiang et al., Applied Optics, vol. 19, No. 16, Aug. 15, 1980; pp. 2705-2708.

"The Design and Application of a Speckle Pattern Interferometer for Total Plane Strain Field Measurement" by Jones; Optics and Laser Tech. vol. 8, No. 5, Oct. 1976, pp. 215-219.

"Laser Speckle Photography and the Submicron Measurement of Surface Deformations on Engineering Structures" by Gregory; NDT International, vol. 12, No. 2, Apr. 1979, pp. 61-70.

Primary Examiner—Gary Chin
Attorney, Agent, or Firm—Harvey B. Jacobson

[57] ABSTRACT

A method and apparatus for measuring stress and strain associated with a pipe, pressurized vessel, structural member or deformable body containing a flaw or stress concentration utilizes a laser beam to illuminate a surface being analyzed and an optical data digitizer to sense a signal provided by the light beam reflected from the illuminated surface. One signal is received from the surface in a reference condition and subsequent signals are received from the surface after surface deformation. The optical data digitizer provides the received signal to an image processor, and the processor stores the signals and correlates the deformed image received with the reference image and then sends this correlated information to a minicomputer which performs mathematical analyses of the signal to determine stress and strain associated with the surface. The apparatus is constructed as one integral unit, and further includes a digital and tape display, as well as a television monitor and an electro-optic range indicator.

11 Claims, 15 Drawing Figures

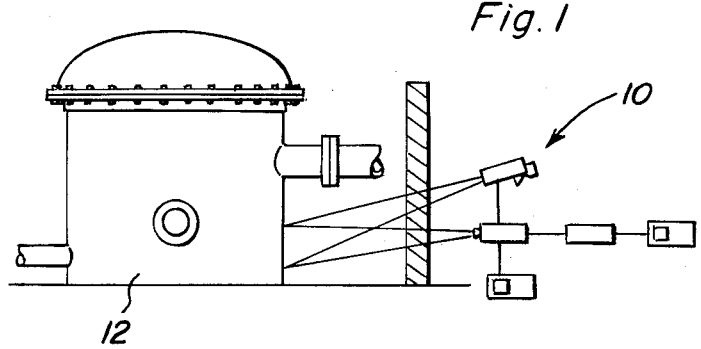
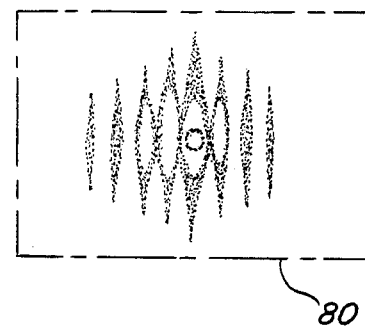
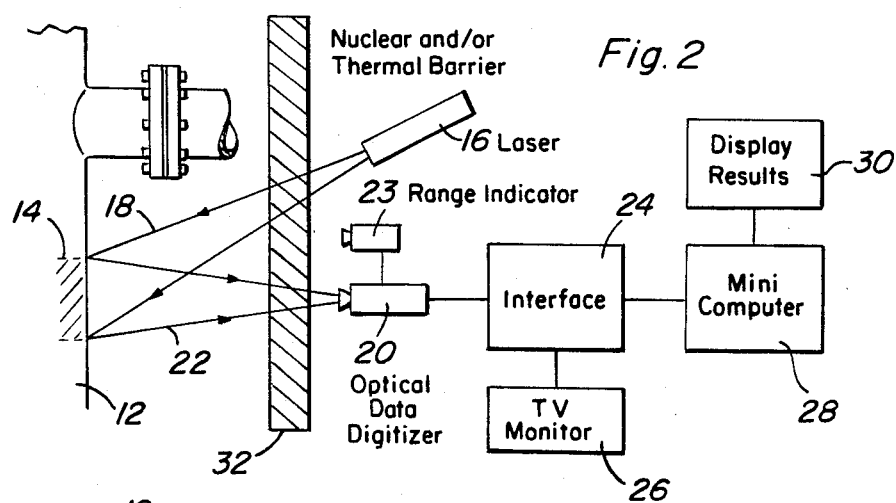
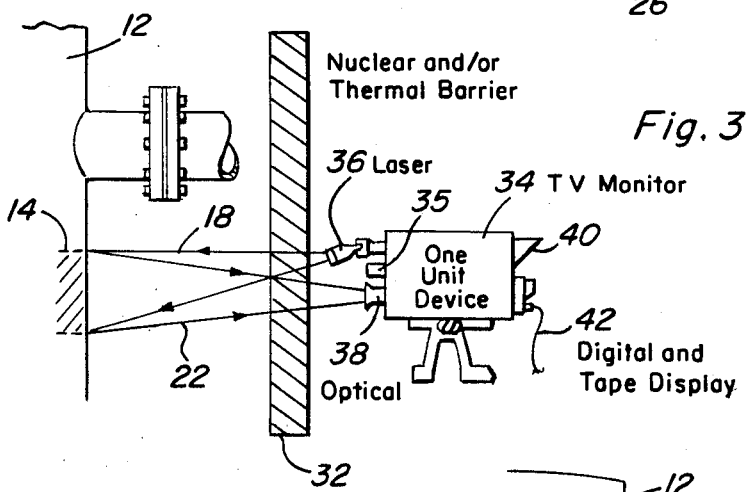
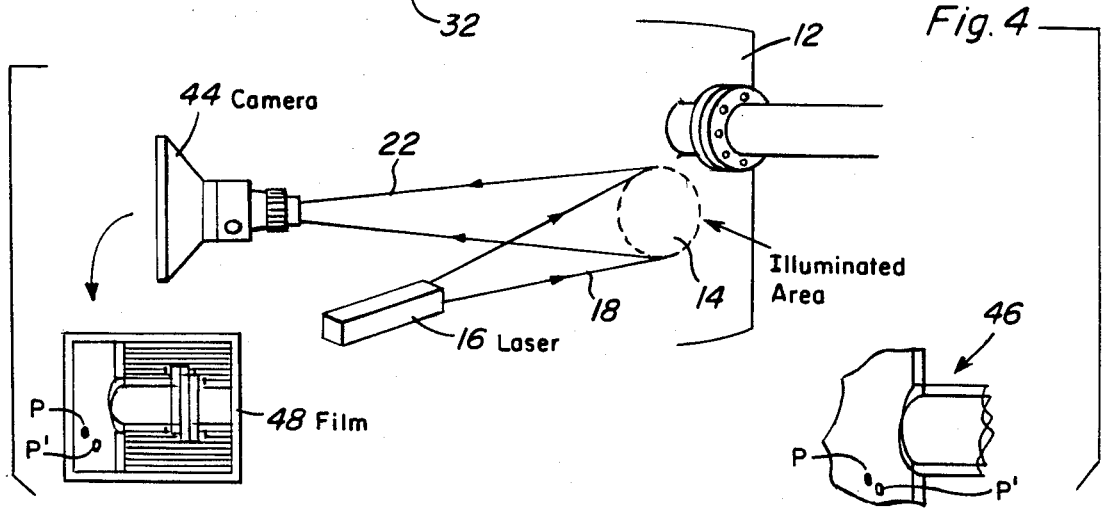

APPARATUS AND METHOD FOR DETERMINING STRESS AND STRAIN IN PIPES, PRESSURE VESSELS, STRUCTURAL MEMBERS AND OTHER DEFORMABLE BODIES

This application is a continuation of application Ser. No. 264,445, filed May 18, 1981 now abandoned.

BACKGROUND OF THE INVENTION

1. Field of the Invention

The present invention relates to a method and apparatus for determining the deformation which occurs on a surface of an object as a result of stressing the object, and more particularly pertains to the invention of a rapid non-destructive, non-contacting device for determining strain and stress in developmental or operating systems, such device utilizing the principle of laser speckle interferometry or an extension of laser speckle interferometry as the device has these alternative capabilities and both are innovations and claims of this patent. The extension of laser speckle interferometry is itself an entirely new concept that is not interferometric in nature but rather a recording, digitizing, correlation and analysis of laser speckle patterns to yield strain and stress. The new concept, although not interferometric in nature, is an extension of the laser speckle interferometric technique in that the same mathematical basis for analysis is employed.

2. Description of the Prior Art

The determination of strain and stress in structural members or in pressure vessels is a problem that is of interest to those associated with structural or pressurized systems. The design engineer or stress analyst is faced with predicting the performance of a system, while the operating engineer or plant supervisor is concerned with monitoring an operating system to insure structural integrity during normal or emergency situations. By the same token, the prototype test engineer is in the middle of the spectrum and is faced with evaluating experimentally the predictions of the design engineer or stress analyst, and eventually certifying the system for operation. The available tools for stress and strain determination, either analytical or experimental as appropriate to each case mentioned, are inadequate or present difficulties to the user.

The prototype test engineer, and the operating engineer or plant manager face additional difficulties if the system operates in or creates a hostile environment of high temperature, toxicity or nuclear radiation, or is in a state of pending disaster. The prototype or operating engineer in these situations is dealing with full sized systems inaccessible to man and intolerant to strain monitoring devices that physically contact the system. This type of situation in many cases, requires or could benefit from continuous real time image data on the strain condition of the system. In this respect, strain and stress condition monitoring is required routinely as evidenced by an article in the Wall Street Journal of June 22, 1977 which states, "it (Nuclear Regulatory Commission) will require inspection of most of the commercial nuclear reactors in the U.S. because cracks have been found in cooling pipes in six units".

With regard to pressure vessels and pipes operating in hostile environments of elevated temperature and nuclear radiation, it should be noted that the same may be subjected to temperature and pressure excursions and cycling which in turn indicates the possibility of thermal stresses. In this respect, the determination of thermal stresses is not easily accomplished, since there are at least three classes of thermally induced stresses.

Specifically, thermally induced stresses may include shrinkage stresses, temperature gradient stresses and thermal shock stresses. In this connection, shrinkage stresses are induced in a body when the body is restrained from free expansion or contraction during a uniform temperature change. Problems involving shrinkage stresses arise in several different areas such as the fabrication of composite structures which have different coefficients of thermal expansion for each material and the operation of energy conversion systems where boundary constraints are imposed against free expansion of a homogeneous structure.

Similarly, temperature gradient stresses are induced in a body due to temperature gradients within the body. These temperature gradients can be of a steady state or transient nature. In either case, the expansion or contraction of the body is not uniform within the body and the resulting internal forces give rise to strains and stresses. When steady state gradients exist, stresses arise if the body is multiply connected as opposed to being simply connected. Multiply connected bodies include plates with holes, turbine blades, heat exchanger tubes and nuclear fuel elements. Transient temperature gradients give rise to stresses in both simple and multiply connected bodies. Usually, the induced stresses associated with transient gradients vary with time until an equilibrium condition is reached. The determination of stresses induced by transient gradients are extremely difficult to solve analytically and in fact, experimental techniques offer the best analysis of stresses induced by transient thermal fields.

As to thermal shock stresses, these arise when a body is subjected to an instantaneous thermal gradient such as a sudden change in surface temperature. The resulting stresses are in essence stress waves that are set up in the body much the same as shock waves. This type of stress occurs when the temperature change in time is considerably less than the mechanical response time of the solid body.

It should be noted that stresses due to transient thermal gradients and thermal shock are often at levels above the elastic limit. Thus, the end results can be severe and conditions such as creep, buckling, collapse, and low thermal fatigue are not uncommon. The experimental method employed to analyze bodies subject to the stresses arising from the three thermal conditions above-described include photothermal elasticity, scattered light photoelasticity, and holographic interferometry.

Photothermal elasticity investigations of thermal stresses have provided experimental solutions to a broad class of two and three dimensional problems. Basically, the methods employed rely on the use of models of the body under study and have been confined to the study of the effects of thermal stresses only. The results of these studies are subject to discussion since the material properties (modulus of elasticity and coefficient of thermal expansion) of the model and the prototype are different and hence, the thermal stresses must be separated from external loads. Also, the available range of temperatures for photothermal elasticity is very small compared to the possible temperature effects in prototypes. Therefore, solutions usually are obtained by solving separately the thermal stress problem and the external load problem, and then superimposing the results.

While this experimental technique has provided solutions to a broad class of problems, the limitations to actual prototype measurements are obvious. In this regard, photothermal elastic techniques include the two dimensional model technique, the stress freezing technique or the embedded polariscope technique.

With respect to the two dimensional model technique, two dimensional solutions involve either plane stress or plane strain assumptions. This solution technique was first applied as early as 1935 for steady state thermal conditions and models. As to the stress freezing technique, there have been several variations of this technique employed in thermal stress problems. However, this classical method is not applicable to problems which require a thermal gradient to be maintained in a model. This is because the optical and physical properties change drastically around the critical temperature (the temperature at which stresses are optically frozen in the model material). Furthermore, this experimental method is not applicable to mixed boundary value problems. These problems arise when two boundaries which have different coefficients of thermal expansion are fixed.

Probably the most useful technique for performing photoelastic studies of thermal stresses involves the use of an embedded polariscope to isolate a plane of a three dimensional model. Embedded polariscopes are particularly applicable to thermal gradient problems and to the determination of stress concentrations due to thermal gradients. However, while this technique is the most promising of the classical photoelastic methods, the basic limitations still apply. Also, the investigator must know a priori which embedded plane to isolate for investigation.

Scattered light photoelasticity is the only one of the classical methods which offers a truly three dimensional solution technique. A photoelastic model is illuminated with a laser and planes are observed in much the same manner as in the embedded polariscope technique. The principal advantage of scattered light photoelasticity is that planes internal to a body can be isolated and stresses resulting from thermal gradients and mechanical loads can be studied. This is the only photoelastic method which is non-destructive and the model can be utilized for many loading configurations. Of all the photoelastic techniques, this method represents the most general solution method for three dimensional transient thermal stress applications. However, the general limitation of all photoelastic studies applies also to the scattered light technique.

Holographic interferometry has been used to study the displacement in high temperature fields in prototypes. These studies represent feasibility investigations, and they have established the potential of the technique for studying thermally induced stresses. However, the technique requires additional research to establish experimental procedures that yield reproducible and accurate results. The principal advantage of holographic interferometry is the fact that it is a very sensitive method of measurement, and the whole surface of a structure can be investigated at the same time, rather than on a point-by-point basis. Although holographic interferometry is well suited for measuring normal movements, there is no general way of eliminating the effect of normal movements from in-plane movements. Also, holographic techniques possess the disadvantage of requiring several separate views of the holographic fringe patterns of a surface. This requires a considerable amount of data reduction to separate out the in-plane displacement field. While holographic interferometry is recognized as an effective optical technique for employing a coherent light source (laser) for detecting and measuring the components of surface displacement and strain, so as to permit a determination of the entire displacement or strain field, there is an additional optical technique known as laser speckle interferometry which presents a promising means of determining stress and strain in bodies.

Laser speckle interferometry is the most recent advance in coherent optics used in an engineering application to measure stresses and strains in bodies, and shows promise of alleviating many difficult problems in experimental mechanics. The basic method utilizes simple high-resolution photographs of a surface which is illuminated by coherent light. The result is a real time or permanently stored whole-field record through interference fringes of a deformed surface. This record yields a map of displacements in the object. On the basis of these introductory statements relative to laser speckle interferometry, some specific examples of the application of the principle are presented. Suggestions for the direct use of coherent light in displacement metrology and contour mapping first appeared in 1968, and it has been shown that if two identical speckle patterns are superimposed on a photographic plate translated laterally by a short distance between exposures, then the diffraction halo generated by the processed plate will consist of a pattern of parallel straight fringes. The diffraction halo observed through a small area of the recorded image will correspond to the local displacement at the corresponding point on the object, and the direction of the fringes will be orthogonal to the direction of the local displacement vector. Additionally, by optically illuminating the developed photographic plate with a converging spherical wave, the entire surface can be analyzed at one time to determine the displacement field of the surface.

In addition to the above, another technique utilizes the laser speckle effect for measuring either normal or in-plane components of displacement over an entire surface at one time. Discussion of in-plane measurements follow to illustrate the general approach. For measurement of the in-plane components of displacement, a surface is illuminated by two beams of coherent laser light, symmetrically disposed about the normal to the surface. These two speckle patterns are superimposed and their resultant speckle pattern is recorded on film. The intensity distribution of the resultant speckle pattern depends on the relative phase of the component patterns. Then one or both speckle patterns is changed and again, the resultant speckle pattern is recorded on the same photographic film. By measuring correlation between the resultant pattern at two different times, a change of relative phase is detected, which in turn gives a measure of surface displacements. These correlation fringes are observed either in real-time or by combining two transparencies having resultant speckle patterns at two different times and illuminating the pattern in a Fourier filter system. A major drawback of this technique is that the path length difference between the two illuminating beams has to be less than the coherent length of the light used to generate correlation fringes.

Two different variations of the dual beam approach for measuring in-plane surface displacements exist. In the first method, the displacement is determined by photographing a coherently illuminated object through two laterally displaced apertures. The displacement is displayed as a pattern of Moire' fringes over the image of the surface. Thus, there is no need for scanning of the beam on a point-by-point basis. As the surface is illuminated by only a single laser beam, the implementation problems associated with the dual-beam technique (mechanical stability and equal path lengths between the various optical components) are minimized. In the second method, the object is illuminated using a single laser beam and photographed via a double exposure before and after displacement. The Fourier transform of the doubly exposed transparency is obtained optically by illuminating the photographic plate with a converging spherical wave. The main advantage of this procedure is that the whole-field displacement can be analyzed and, by appropriate position of a set of apertures in the transform plane, any component of the displacement normal to the line of sight can be detected with variable sensitivity.

The main advantages of speckle interferometry over photoelasticity and holographic interferometry include the fact that many measurements may be obtained within the confines of the laser photograph which, with powerful pulsed lasers, could cover several meters of surface area. Further, the line of movement and its components of motion are given by the fringes, and strain gages which are susceptible to damage are not utilized. Additionally, the speckle interferometry method is non-contacting, and no special cleaning or surface preparation is necessary, with the exception that only contamination such as thick dust must be removed. Finally, measurements at high temperatures far in excess of the strain gage range are possible.

Speckle interferometry does have some limitations however, such as the fact that measurements are not as accurate as those made with strain gages. However, the inaccuracies usually associated with the laser speckle technique involve numerical error in calculating the derivatives, and not the metrology of the laser speckle technique per se. Strain gage measurements with accuracies of 1% can be obtained while strain calculations using the speckle data technique result in accuracies of approximately 5%. The accuracies associated with the numerical analysis technique used with the speckle approach will be improved as a result of the computerized approach employed by the present invention. Also, fringe analysis is time consuming in that the analyst must view the photographic plates, make the necessary measurements and then calculate the results. However, this limitation can be overcome by using an optical data digitizer system, including an image storage device and a computer for data correlation and analysis, as proposed by the present invention.

In summary, it should be pointed out that the classical techniques employed to determine thermal stresses must rely on the use of models of the operating system being investigated. Laser speckle interferometry is not dependent on the use of models and is in fact applicable to full scale systems. Many of the recent advances in coherent optics have suggested the engineering applications to prototype systems; however, with all of the techniques developed thus far, the recording medium has been photographic film. Therefore, data analysis has required the use of a specialist for interpretation. Even with this limitation, though, the great potential of coherent optics techniques for engineering analysis has been clearly demonstrated.

The laser speckle effect, which is the basis of the new concept of this invention, promises to be the optical technique whereby the photographic film can be eliminated in the data acqustion process. The elimination of the photographic film means that interference fringe patterns classically assosciated with laser speckle interferometry need not be employed to yield data. These fringe patterns can be generated in the electronic imaging system of this invention and analyzed as in the classical case of interferometry and this capability is one claim of the invention. However, the invention is capaple of eliminating this step by introducing a laser speckle technique based on the digital correlation of successive laser speckle patterns before and after object surface deformation. Thus, laser speckle and digital correlation, as the technique is proposed to be termed, has its foundation in laser speckle interferometry and has all the attributes of laser speckle interferometry without the necessity of photographs and fringe measurements. The laser speckle and digital correlation will be accomplished through the development of electronic video systems capable of high resolution of the speckle patterns. The compatibility of the speckle technique with image processing offers a user-oriented system for a wide range of engineering applications. Finally, it should be pointed out that there is commercially available an Electronic Speckle Pattern Interferometry (ESPI) device for time averaged holographic stress analysis, as reported in Materials Evaluation (May, 1979). However, this device, while demonstrating the fact that speckle patterns can be digitized, does not include the use of a computer for data analysis and management and does not have the capability to by-pass the step of creating interference fringe patterns, as its sole purpose is to create these patterns. Furthermore, the ESPI device requires that the body under investigation be vibrated in order to generate the fringe patterns as opposed to illumination alone by a coherent light source.

SUMMARY OF THE INVENTION

The present invention, which will be subsequently described in greater detail, provides for an apparatus and method for determining wholefield, regional or pointwise, stress and strain associated with pipes, pressure vessels, structural members and deformable bodies (including both isoropic and anisotropic materials) which has all of the advantages of the prior art devices and methods and none of the disadvantages. To attain this, the present invention provides for a direct read out, non-destructive, non-contacting device to determine strain and stress in pipes, pressure vessels or other bodies on a real-time basis. The device is optical in nature and can operate at some distance from the body under investigation, and thus, the device is insensitive to hostile environments. The present invention is based on the application of the speckle effect produced by illumination of a diffuse surface by a coherent source of light. Basically, this effect is accomplished by illuminating a surface which is under examination through the use of a laser. The illuminated surface reflects the laser beam, and this reflected signal is recorded by an optical data digitizer which can record interference fringes or laser speckle patterns. If the surface exhibits deformation or strain subsequent to a previous recording of the fringe pattern or laser speckle patterns, a new recording of fringe or speckle patterns will result in a measurement of object movements, i.e., a difference between the original and subsequent patterns. The measured differences in these patterns can be mathematically related to the actual deformation and hence stress of the body being examined. The optical data digitizer is not only employed to directly receive the reflected light beam but to also send a signal representative of the reflected beam directly to a minicomputer for mathematical analysis.

It is therefore an object of the present invention to provide an apparatus and method for measuring stress and strain in pressurized systems, structural members and deformable bodies which has all of the advantages of the prior art devices and none of the disadvantages.

It is another object of the present invention to provide an apparatus which may be used to measure stress and strain in pressurized systems, structural members or deformable bodies which may be easily and economically manufactured.

It is a further object of the present invention to provide a method and apparatus for determining stress and strain in pressurized systems, structural members or deformable bodies which will rapidly indicate the strain and stress patterns associated therewith.

Still another object of the present invention is to provide a method and apparatus for determining stress and strain in a pressurized system, structural members or deformable bodies which is non-destructive in nature.

Yet a further object of the present invention is to provide a method and apparatus for determining stress and strain in a pressurized system, structural members or deformable bodies which requires no contact of the measuring device to determine such stress and strain relationships.

An even further object of the present invention is to provide a method and apparatus for determining stress and strain relationships in a pressurized system, structural members or deformable bodies which effectively makes use of speckle interferometry or laser speckle and digital correlation, the new concept introduced herein.

Even another object of the present invention is to provide a method and apparatus for determining stress and strain relationships in a pressurized system, structural members or deformable bodies which eliminates the need for photographic recordings of surface displacement data and an interferometrist to read and analyse the photographic data.

Still a further object of the present invention is to provide a method and apparatus for determining stress and strain relationships associated with pressurized systems, structural members or deformable bodies which will give real-time indications of strain and stress directly and which will be applicable to nuclear pressure vessels, synfuel generation plants and any system or structure operating under pressure or static and dynamic loading.

Further still another object of the present invention is to provide a method and apparatus for determining stress and strain relationships associated with pressurized systems, structural members or deformable bodies which can be effectuated at a safe stand off distance from a hostile environment of temperature, toxicity and radiation, or remotely within the environment.

Yet even another object of the present invention is to provide a method and apparatus for determining stress and strain relationships in pressurized systems, structural members or deformable bodies which is based on the development of the theory of fringe formation in laser speckle interferometry and the extension thereto referred to as laser speckle and digital correlation to include thermal transients.

Another further object of the present invention is to provide a method and apparatus for determining stress and strain relationships associated with pressurized systems, structural members or deformable bodies which is based on the development of laboratory apparatus for electronically acquiring displacement data for a body undergoing deformation, and storing such data.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic illustration of the basic system forming the present invention as used for measuring or monitoring stress and strain in a region of an operating system.

FIG. 2 is an enlarged view of the data recording system forming the present invention as shown in FIG. 1 and employing laser speckle interferometry and/or laser speckle and data correlation.

FIG. 3 schematically represents the apparatus and system of FIG. 2 in a form whereby all of the components of the system are combined in one integrated unit.

FIG. 4 schematically represents the system of data recording as utilized in laser speckle interferometry.

FIG. 7 is an illustration of a typical speckle photography fringe pattern obtained in an optical data analysis system.

DESCRIPTION OF THE PREFERRED EMBODIMENT

Figure 5:
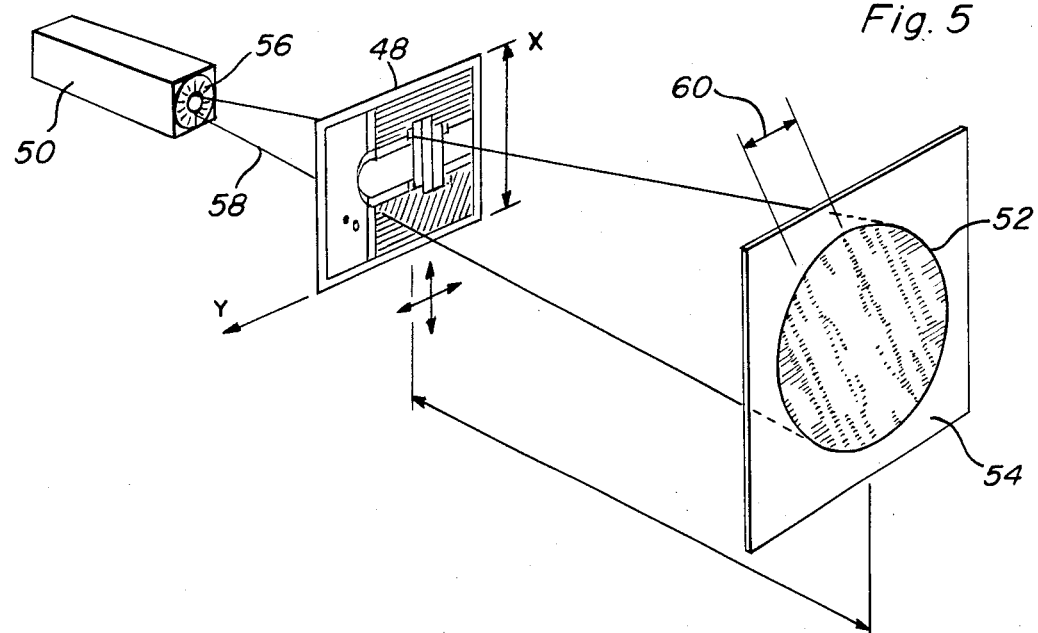
FIG. 5 schematically represents the system of data analysis utilized in laser speckle interferometry.

Reference is now made to the drawings and, in particular, to FIGS. 1 and 2 wherein there is schematically illustrated a system which may be employed to determine the stress and strain relationships forming the present invention and being generally designated by the reference numeral 10. In this respect, the stress and strain measuring system 10 can be used to measure the stress and strain associated with any type of pressurized vessel 12 through the projection and focusing of a light beam on a critical region 14 associated with the vessel. However, the device is not limited to use with pressure vessels but a pressure vessel is used for illustrative purposes. As shown, the system 10, as a minimum, includes a laser light source 16 for projecting a light beam 18 against a critical region 14, and an optical data digitizer 20 for receiving the light beam 22 being reflected from the critical region. In this regard, the optical data digitizer 20 might typically be a television camera, and the signal received by the digitizer may then be directed to a computer interface device 24 which serves to process the received signal and direct the same to a television monitor 26 as well as to a minicomputer 28. The television monitor 26 is effectively a high-resolution monitor and provides a graphical data display. On the other hand, the minicomputer 28 serves to take the same signal as provided to the television monitor 26 and further enhance the data provided, thereby to display the results on a display unit 30. In this connection, the minicomputer 28 can provide a display. Additionally, an electro-optic or other range indicating device 23 is employed to indicate the distance between the digitizer 20 and the critical region 14.

FIG. 3 has been provided solely for the purpose of illustrating the various components shown in FIG. 2 in a system whereby the same are operatively and functionally combined into one integral unit 34. In this regard, it can be seen that the integral unit 34 could be positioned external to a nuclear radiation or thermal zone 32 and would include a laser light source 36 fixedly secured thereto and being utilizable to direct the light beam 18 against the critical region 14 in the manner aforedescribed. The reflected light beam 22 then would be directed to an optical data digitizer 38, also integrally a part of the unit 34, and a television monitor 40 integrally a part of the unit 34 could then be used to view the received data. An electro-optic range indicating device 35 would perform the distance measuring function, while the unit 34 would perform the computing function so as to provide a data read out on the digital and tape display 42 associated therewith.

Laser Interferometry

A better understanding of the technique of using laser interferometry can be ascertained with reference to FIG. 4. Typically, laser interferometry can be used to analyze a structure 12 through the use of a laser light source 16 having an expanding lens whereby the light beam 18 directed against a critical area 14 expands outwardly from the light source. A camera 44 may then be employed to image the light 22 reflected from the critical surface 14 and then to record the surface in two configurations. The two configurations are a representation of the deformation of the structure 12 resulting from an applied load or thermal effect. A photographic plate 48 within the camera 44 records an image 46, which is separately illustrated in FIG. 4, such image including a surface point on the body 12 at position P representative of the first exposure. The same point is imaged at point P' after deformation, and of course, if there is no deformation, the point P' will be imaged at P during the second exposure.

Once a film record 48 is made and is complete, it must be processed and analysed to determine the magnitude of deformation of the area 14 photographed. Conventionally, as illustrated in FIG. 5, each developed plate 48 is illuminated by a laser 50 for the purpose of performing an analysis of the provided data. This method of data analysis, known as pointwise filtering, projects a set of parallel interference fringes 52 on a viewing screen 54. In this respect, the laser 50 is provided with an expanding lens 56 so as to project a light beam 58 through the film plate 48 to thereby project the enlarged image 52 onto the viewing screen 54. The distance 60 between respective fringes on the viewing screen 54 is proportional to the displacement of point P, and there is a mathematical correlation of the fringe pattern 52 and displacement, and hence strain/stress. Thus, the analyst must view the projected image (such as illustrated in FIG. 7) of each plate, make measurements and then use these measurements as input to a mathematical procedure to yield strain and then stress relative to the original point P.

Figure 6:
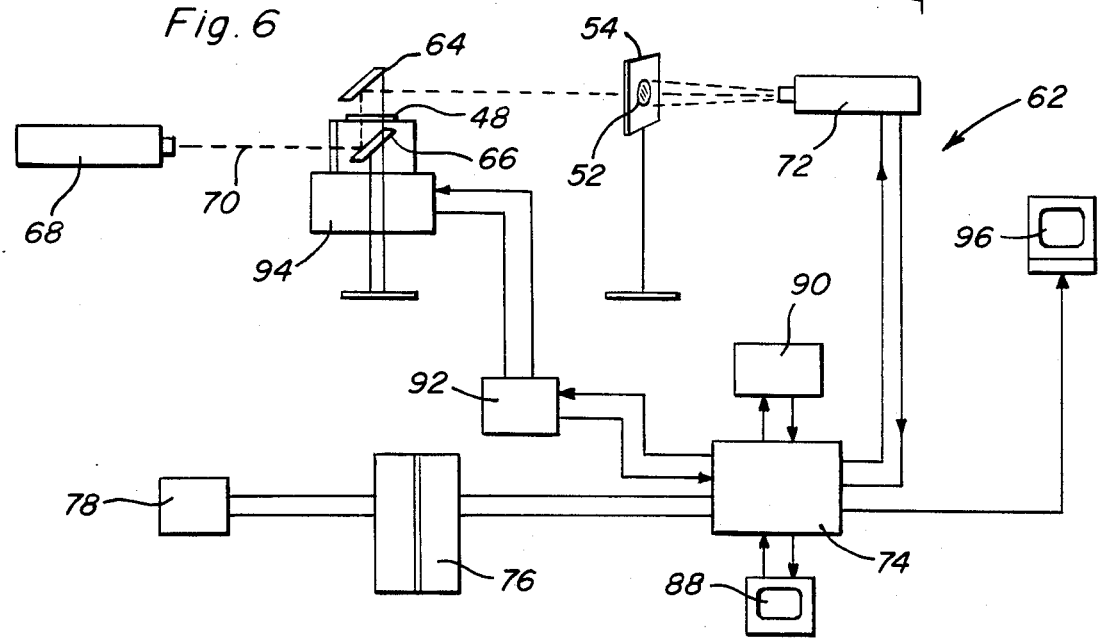
FIG. 6 is an expanded schematic illustration of the apparatus and method for determining stress and strain relationships in pressurized systems as employed in laser speckle interferometry.

Present Automated Film Analysis Technique for Laser Speckle Interferometric System To reduce the complexity and time consumption associated with data analysis as performed in the manner illustrated in FIG. 5, a present laser speckle interferometric system makes use of the data analysis system 62 illustrated in FIG. 6. Specifically, the film 48 having the double exposure thereon including the points P and P', is positionable between a pair of mirrors 64, 66. A laser 68 directs a beam of light 70 against the reflective surface of the first mirror 66 whereby it is reflected up through the film plate 48 against the reflective surface of the second mirror 64. The image 52 which is projected from the second mirror 64 is then displayed on a viewing screen 54 in a manner similar to that illustrated in FIG. 5. A television camera 72 then views the image 52 and directs a picture of the same to a video computer interface 74. A minicomputer 76 having a conventional terminal 78 may then be used to analyze the image 52 as provided to the video computer interface 74. Specifically, the minicomputer 76 can be utilized to perform a conventional mathematical analysis which would normally be computed by hand so as to substantially reduce the time consumption and complexity of such analysis. The analysis which would be performed by the minicomputer 76 can be understood by reference to FIG. 11 of the drawings wherein the object coordinates at a surface point P are illustrated, i.e., the displacement of the surface of an object is completely described by a vector $$\overline{U}(x,y,z,t)$$

Figure 11:
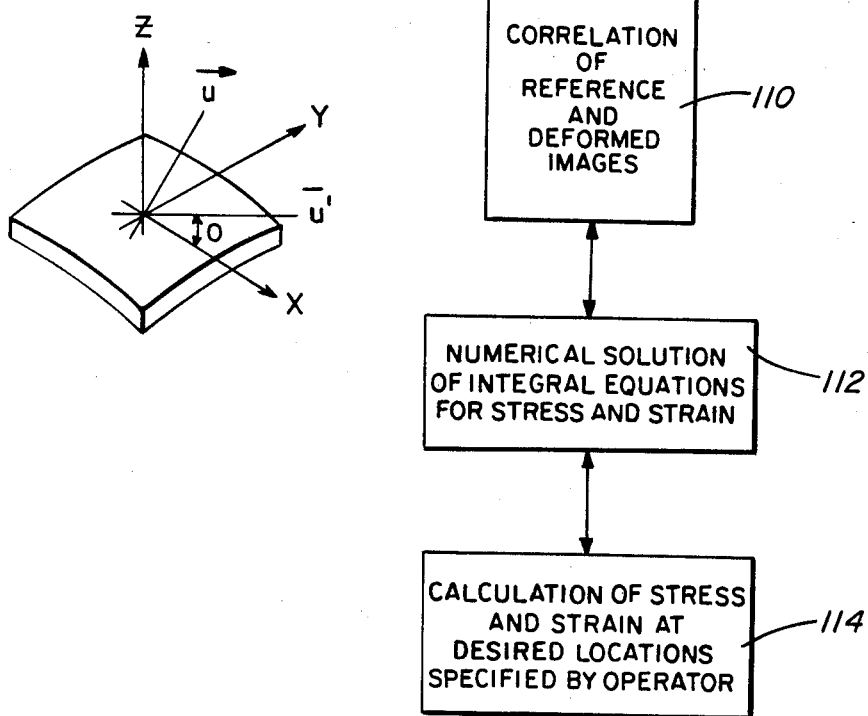
FIG. 11 is a schematic illustration of the object coordinates mathematically obtainable at a surface point, P.

Recognizing that the coordinates x,y,z are restricted to the surface of the body shown in FIG. 11, the tangential components $\overline{U}'$ and the angle $\theta$ are the data that are recorded and analyzed by the laser speckle photography. Thus, at each prescribed surface point P, the tangential components of the displacement vector U can be stored in the memory of the minicomputer 76. These data then can be used to numerically calculate the stresses and strains as desired.

Specifically, a vector gradient $U_{ij} = \nabla \cdot \overline{U}$ may be separated into symmetric and skew symmetric parts, where $$U_{ij} = \overline{V} \cdot \overline{U} = \frac{\partial U_i}{\partial X_j} = \epsilon_{ij} + \omega_{ij}$$

is the symmetric part, and $$\epsilon_{ij} = \frac{1}{2}\left(\frac{\partial U_i}{\partial X_j} + \frac{\partial U_j}{\partial X_i}\right)$$

$$\omega_{ij} = \frac{1}{2}\left(\frac{\partial U_i}{\partial X_j} - \frac{\partial U_j}{\partial X_i}\right)$$

is the skew symmetric part. When the values of $\epsilon_{ij}$, $\omega_{ij}$ are small as compared to unity, then the symmetric part $\epsilon_{ij}$ is the strain matrix and $\omega_{ij}$ is the rotatic matrix. The quantity of the primary matrix is the strain matrix $\epsilon_{ij}$ which is calculated from the experimental data.

For elastic determination of an isotropic material, the stress/strain relations are $$\epsilon_{ij} = \frac{1}{E}[\sigma_{ij} - \nu(\sigma_{ij})\delta_{ij}] + \alpha\Delta T$$

where E is the modulus of elasticity, $\nu$ is Poissons ratio, and $\alpha$ is the coefficient of thermal expansion. Generally, the surface point P is located on the free surface of a body, and therefore, additional relationships are obtained from the boundary conditions and the known mechanical loading on the surface. In this connection, $T_k = \eta_i \sigma_{ik}$ may be calculated, where the surface traction $T_k$ is known, and in most cases $T_k = 0$. This implies that $\sigma_{zi} = 0$, and the result now becomes $$U_{xz} = -U_{zx}$$
$$U_{yz} = -U_{zy}$$

$$\frac{\partial U_z}{\partial z} = -\frac{\nu}{1-\nu}\left(\frac{\partial U_x}{\partial x} + \frac{\partial U_y}{\partial y}\right)$$

Thus, with the measured value of the laser speckle and the known mechanical loading, the surface stress and strain components can be calculated at any described surface point P by the minicomputer 76. The expressions for the strain components are $$\epsilon_{xx} = \frac{\partial U_x}{\partial x}$$

$$\epsilon_{yy} = \frac{\partial U_y}{\partial y}$$

$$\epsilon_{zz} = -\frac{\nu}{1-\nu}\left(\frac{\partial U_x}{\partial y} + \frac{\partial U_y}{\partial x}\right)$$

$$\epsilon_{xy} = \frac{1}{2}\left(\frac{\partial U_x}{\partial y} + \frac{\partial U_y}{\partial x}\right)$$

$$\epsilon_{xz} = \epsilon_{yz} = 0$$

Similarly, the components of the rotation vector $\omega$ are $$\omega_x = W_{zy} = \frac{\partial U_z}{\partial y}$$

$$\omega_y = W_{xz} = -\frac{\partial U_z}{\partial x}$$

$$\omega_z = \omega_{yx} = \frac{1}{2}\left(\frac{\partial U_y}{\partial x} - \frac{\partial U_x}{\partial y}\right)$$

The stress components $\sigma_{ij}$ can now be determined from the strain components through the stress/strain relationships as stated previously.

Figure 8:
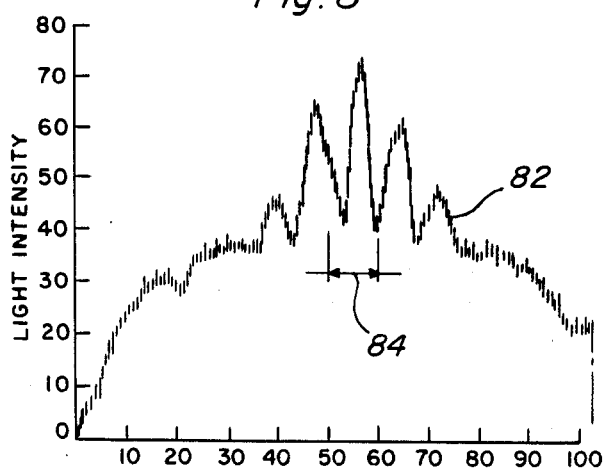
FIG. 8 is a graphical illustration of the original data obtained from the average of a first scan line and a second scan line image prior to and subsequent to deformation.

With respect to the data transmitted from the video computer interface 74 to the minicomputer 76, it should be noted that the typical interference pattern 80, as shown in FIG. 7, will be converted to a data analysis record 82, as shown in FIG. 8, by the video computer interface. Effectively then, the data analysis record 82 having fringe spacing 84 will be filtered digitally (numerically within the computer) so as to produce the result 86 shown in FIG. 9 and to provide the same to a storage display screen 88. This process signal 86 is then a measure of the fringe spacing 84 as shown in FIG. 8.

Figure 9:
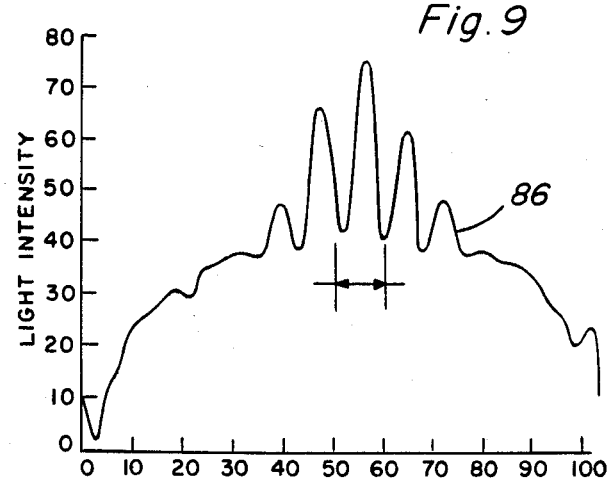
FIG. 9 is a graphical illustration of the filtered data of the averaged scan lines of FIG. 8.

Also illustrated in the data analysis system 62 of FIG. 6 is the use of a scan converter 90 in conjunction with the video computer interface 74. The scan converter 90 is of a conventional construction and is essentially used to sample images provided, while use might also be made of an X-Y controller 92 in combination with a X-Y table 94 to facilitate a permanent graphical recording of the calculated stress and strain relationships. While FIG. 8 illustrates the typical display viewable on the storage display screen 88, a monitor 96 might be provided for visually viewing the filtered display 86 as shown in FIG. 9.

Speckle and Digital Correlation Device of This Invention

It can be seen from the discussion relative to the data analysis system 62 illustrated in FIG. 6 that while the described technique and apparatus can be used and does work, the use of photographic plates 48, with the required intermediate development of these plates, is time consuming. Furthermore, present techniques require one plate 48 for each double exposure. As such, the present invention further envisions utilizing the optical data digitizer 20, as shown in FIG. 2, along with the same basic single beam laser technique, so as to replace the film 48 and the image storage system coupled to a computerized analysis technique, as shown in FIG. 6, so as to provide for a direct read out of the resulting stress and strain relationships. Furthermore, the present invention does not rely on the determination of fringe pattern spacing to determine amplitude displacement and hence strain/stress, as is the case with the technique of FIG. 6. The present invention has the capability of eliminating the photographic process and determining strain/stress by electronically constructing and analyzing fringe patterns and this is an option of this invention, but the present invention goes a step beyond. Specifically, a new concept is introduced. A laser speckle pattern constituting the reflected optical signal from the surface in question is recorded. A subsequent laser speckle pattern from the same surface location subsequent to deformation of the surface is recorded. The displacement of the second pattern relative to the first is determined. A mathematical analysis correlating this displacement to surface strain and stress is carried out by the computer software of the present invention. The basic theory used in this correlation is predicated on the theory of data acquisition in pointwise filtering employed in single beam laser interferometry as presented earlier.

Figure 12:
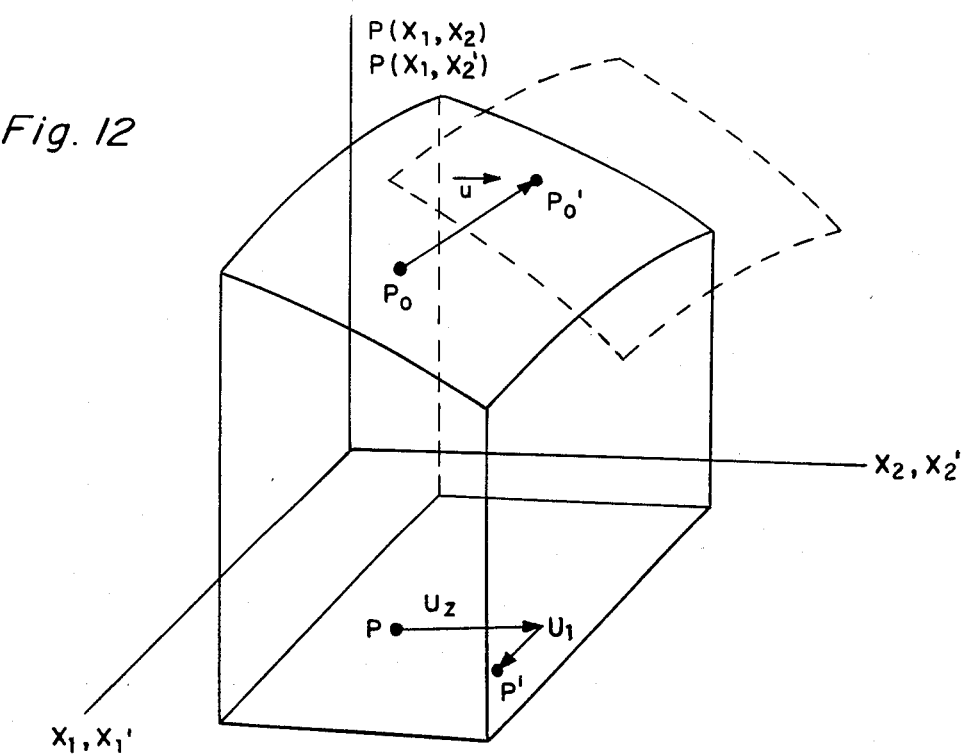
FIG. 12 is a schematic of the reference and deformed surface for correlation of laser speckle patterns.
Figure 13:
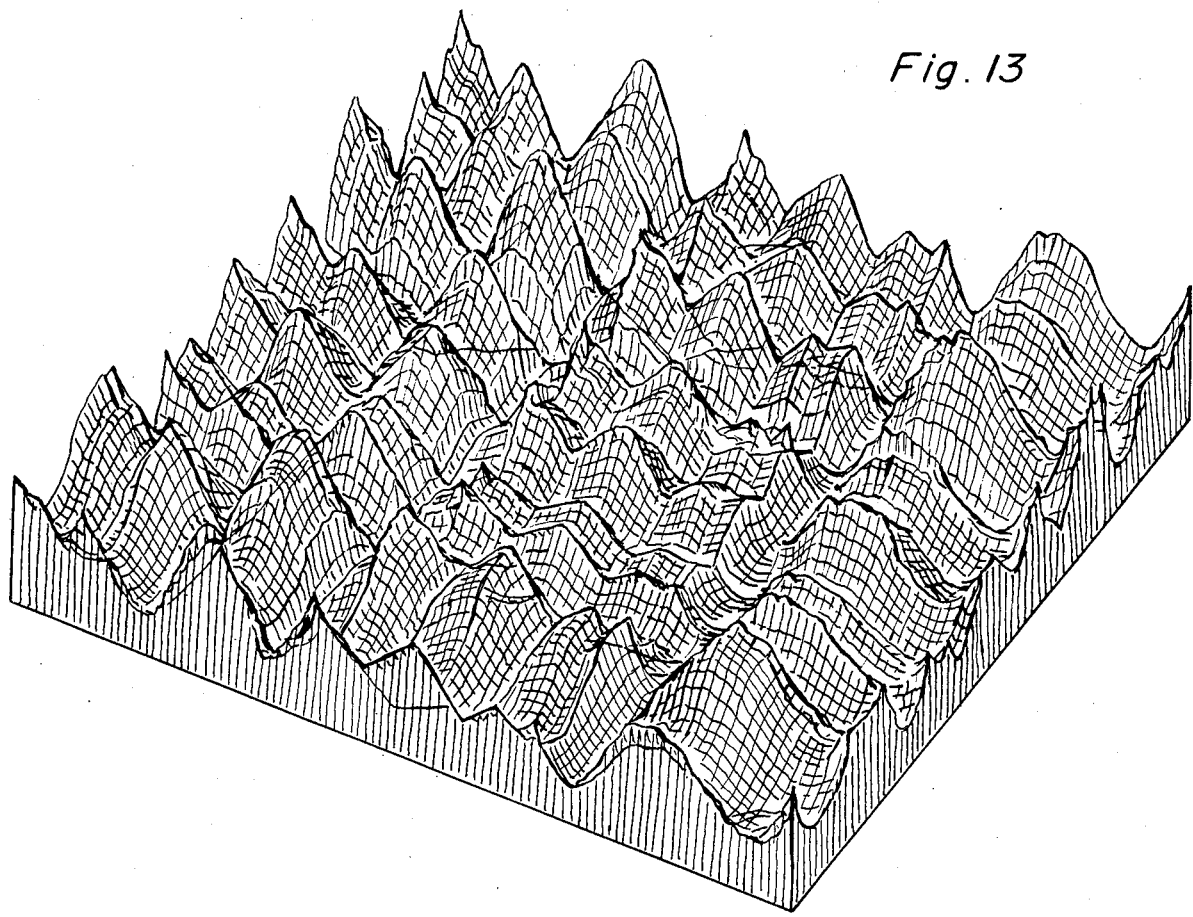
FIG. 13 is the digitized optical surface resulting from the speckle pattern of the surface under investigation.

The mathematical basis for the present invention is as follows. A diffuse surface (FIG. 12) is illuminated with a laser beam and the resulting intensity pattern of the reflected optical signal is digitized and stored in memory of a minicomputer. The digitized intensity pattern constituting this stored date is shown in FIG. 13. This digitized intensity pattern of the reference surface is denoted as $P(X_1' X_2)$ (FIG. 12), where $X_1 X_2$ are the coordinates of the illuminated surface. When the diffuse surface is deformed relative to the reference configuration, a complex field $P(X'_1, X'_2)$ represents the intensity of the surface in the deformed position (FIG. 12). The measurement of the displacement ($U_1$ and $U_2$ which represents movement of P to $P^1$ in FIG. 12) of the surface is obtained by correlating $P(X_1, X_2)$ and $P(X_1', X_2')$. This correlation is determined using the auto correlation function of the two signals, $$C(U_1, U_2) = \int_M P(X_1, X_2) P(X_1', X_2') dx_1, dx_2$$

where

M = area of the illuminated surface with the laser.

$X_1' = X_1 + U_2$ and $U_2$ is the displacement in the $X_2$ direction (FIG. 12).

$X_2' = X_2 + U_2$ and $U_2$ is the displacement in the $X_2$ direction (FIG. 12).

Figure 14:
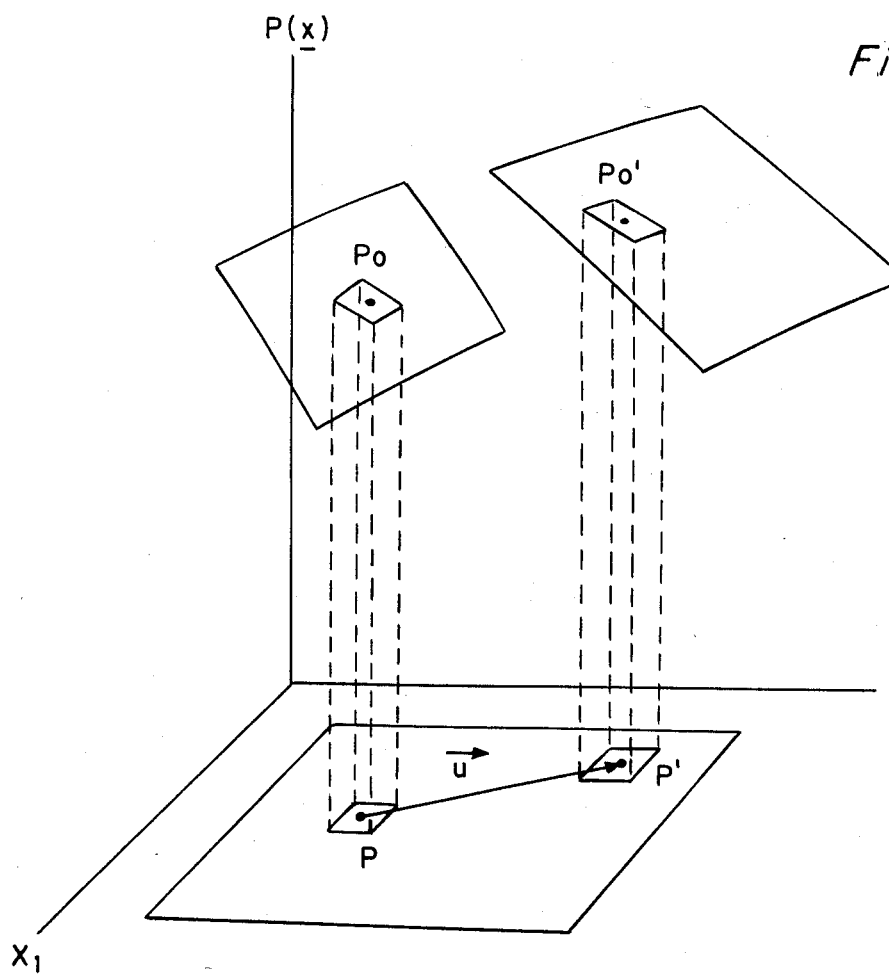
FIG. 14 is a schematic of the reference and deformed subsets of the original and displaced surfaces.

The approach to correlating $P(X_1, X_2)$ with $P(X_1', X_2')$ is to assume the basic theory of pointwise filtering used in single beam laser speckle interferometry. The restrictions in pointwise filtering optics dictates the following approach in laser speckle and digital correlation. The reference signal $P(X_{1'}, X_2)$ is recorded over some area M of an illuminated object. Within some small area Po' contained in $P(X_1', X_2')$ the displacement components $U_1$ and $U_2$ are uniform. This restriction in the data analysis allows the auto correlation function to be expressed in the following form $$C(U_1, U_2) = \int_M P(X_1, X_2) \Delta P(X_1 + U_1, X_2 + U_2) dx_1 dx_2$$

where $$\Delta P = (X_1 + U_1, X_2 + U_2)$$

is a small area of the deformed laser speckle pattern where $U_1$ and $U_2$ are uniform (FIG. 14). The correct values of $U_1$ and $U_2$ corresponding to the displacement will result in a maximum value of the correlation function $C(U_1, U_2)$. This correlation procedure corresponds to the data analysis procedure in pointwise filtering in single beam laser speckle interferometry and thus completes the data analysis at a point.

Figure 15:
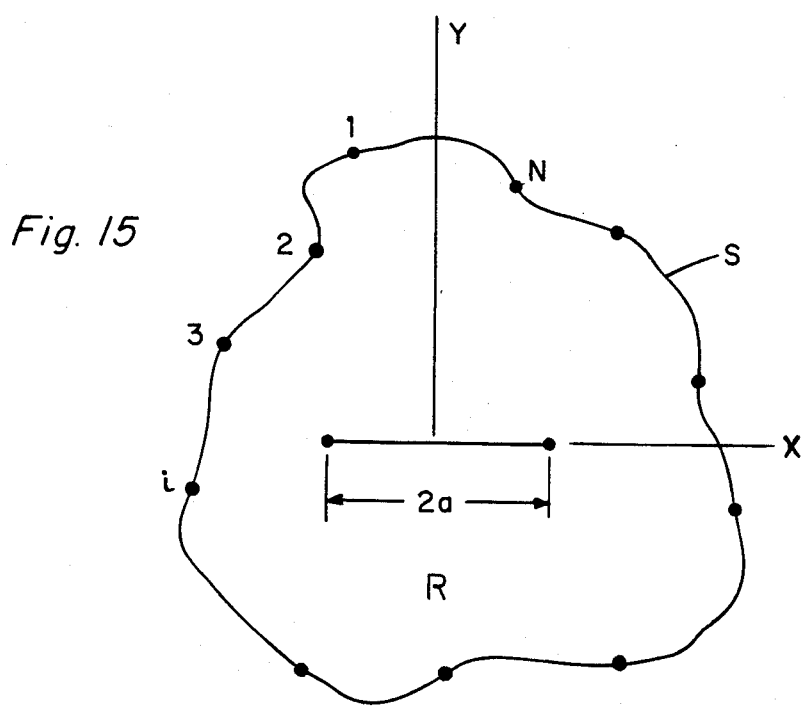
FIG. 15 is a schematic illustration of a region on the object under investigation containing a crack.

Since this analysis is automated, the displacements at any desired number of locations can be calculated. The principle of operation of the present invention around regions of surface cracks or stress concentrations is carried out as illustrated using FIG. 15. A closed boundary denoted as S surrounds a crack of length 2a. The optical (FIG. 3) digitizer records the laser speckle digital signal before and after the object is deformed (Region 14 of FIG. 3). A typical digitized laser pattern is shown in FIG. 13. The optical data digitizer records this pattern and stores in memory the pattern referred to as the reference signal. At desired points around the boundary S denoted as points 1 through N, the deformed signal is correlated with the reference signal 110 in FIG. 10, as was just explained. At each desired boundary point on S the displacement components (FIGS. 12 and 14) are calculated from the correlation of reference and deformed images. This displacement data is then used as input to the solution of the integral equations for stress and strain (112, FIG. 10). The operator (114) then can specify the calculation of stress and strain at any desired location inside the closed region R (FIG. 15). In other words, the need for the film 48 can be eliminated, and a direct computation of the strain/stress via the computer 76 and optical data digitizer 20 can be made. Again, reference is made to FIG. 3, where it is to be understood that the system 10 might be combined into one integral unit 34 so as to further enhance the ease of computation required for obtaining the stress and strain relationships.

Figure 10:
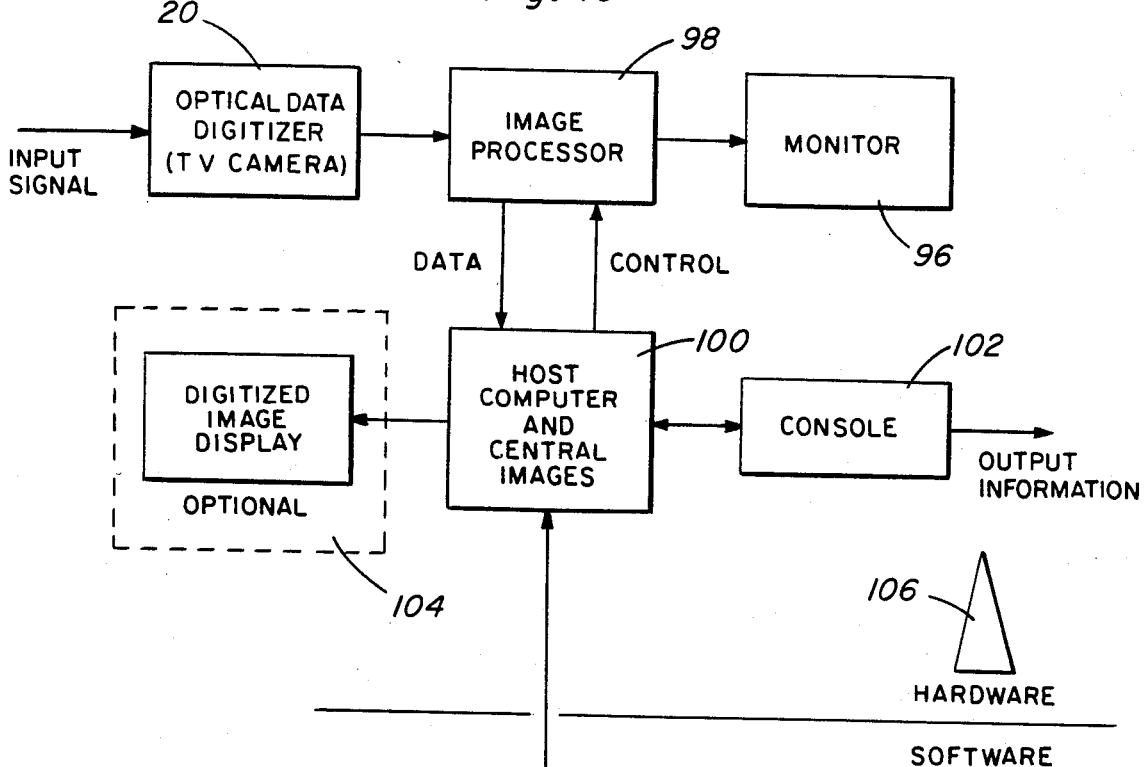
FIG. 10 is a block diagram illustrating the method associated with the apparatus of the present invention.

In this connection, reference is made to FIG. 10 of the drawings which is a block diagram of the process associated with the apparatus illustrated in FIGS. 2 and 3. Specifically, the optical data digitizer 20 senses the input signal, which is effectively the reflected light beam 22 shown in FIGS. 2 and 3, and then digitizes the signal. Equipment to accomplish this step exists, and there are basically two types of equipment—a vidicon television camera and an image disection camera. The choice of camera types is a function of the resolution required. Current conventional vidicon cameras have a $512 \times 512$ resolution, and current image disection cameras have a maximum $4000 \times 4000$ resolution. The time required to digitize the signal increases as the resolution increases. The present invention can employ either camera or an improved camera or cameras depending, as indicated, on the resolution and response time desired.

An image processor 98, which is utilized for sorting and storing data, receives the digitized data from the optical data digitizer 20 and sends the data to the host computer and central controller 100 for storage and manipulation. In this respect, the host computer 100 controls the image processor 98.

Since the optical digitizer 20 can be a conventional camera with $512 \times 512$ resolution or better or an image disection camera with up to $4000 \times 4000$ resolution or better, there are two concepts for the image processor. One concept applicable to the use of conventional camera employs a commercially available hardware item which can digitally process a picture frame at least in 1/30 of a second. This device is a high speed image preprocessor when the same is connected to a computer. Connection between this device and the computer is through an IEEE (Institute of Electrical and Electronics Engineers) interface bus or other appropriate connector. The other concept employed with a disection camera is to connect the camera directly to the computer 100 and process the signal with computer software. Random access control of the image processor 98 in both cases is accomplished with computer software. As to host computer 100, there are many computers available which can be utilized as the host computer and central controller. A typical computer would be a DEC (Digital Equipment Corporation) Model PDP-11 series having mass storage capabilities or other appropriate computer. Additionally, a console 102 for interaction with the computer 100 would be available depending on the computer selected. FIG. 10 further illustrates the use of a monitor 96, and further an optional digitized image display 104 might be employed.

While this portion of the process described has been directed to the system hardware 106, it should be noted that the process further includes a software portion 108. Effectively, the software portion 108 includes a correlation of the reference and deformed images 110 and a mathematical analysis of the same, and then further includes the numerical solution of integral equations for stress and strain 112 which are effectively the experimental boundary integral equation techniques which form the mathematical foundation of the numerical analysis. Finally, the software portion 108 involves the calculation of stress and strain at desired locations 114 which, of course, may be specified by the operator.

In summary, it should be realized that the current laser speckle interferometry technique, while valid, is time consuming and costly, even on a laboratory basis. The present invention, while based on the proven technique employing photographic film and visual observation, coupled with analysis, represents a significant advancement in the state of the art. The present invention, as illustrated in the Figures of the drawings, may be used in a manner which replaces the photographic plates with an optical data digitizer camera and image processor coupled to a computer. This form of the invention permits a rapid sequence of test records of laser speckle patterns or interference fringes to be acquired over a critical region of interest, as well as permitting a determination of the difference in laser speckle patterns or fringe patterns to be measured and a converting of these measurements into a digital display on a real-time basis. Furthermore, the computer can store the data for display as required.

Thus, the invention as illustrated not only presents an advancement in the state of the art, but also translates a laboratory proven technique into a commercial device. The invention will be utilizable by a trained technician, as opposed to requiring a laser speckle interferomerist/stress analyst or highly trained engineer. Further, it will permit a real-time analysis of a full-scale operating system and will permit sequential observation of critical points in the system as a function of time. In addition, the invention will not be limited to applications involving pressurized systems, e.g., the device could be used to review structural members such as the pilons on a DC-10 aircraft. In this respect, the present invention could be applied to nuclear reactor components operating in hostile environments, pressure vessels, pipe lines and pipe systems, structural members having regions of high stress gradients such as geometrical discontinuities (holes, cut-outs, fillets and grooves), aircraft bodies and associated components, turbine blades (fillet area where peak stresses occur), energy conversion plants, chemical processing plants, and data analysis in non-destructive testing. As can be appreciated, there are many more specific and general applications which could apply in addition to those above listed. As indicated, the present invention gains its utility from the fact that it is a direct read out, non-destructive, non-contacting device which yields strain/stress data on a real-time basis for full-scale systems. Furthermore, the output of the present invention could constitute input to more complex analysis programs, thus further increasing its versatility.

While one construction of the present invention has been described in detail, it is to be understood that the optimum dimensional relationships for the parts of of the invention are deemed readily apparent and obvious to one skilled in the art, and all equivalent relationships to those illustrated in the drawings and described in the specification are intended to be encompassed by the invention, subject only to limitations specifically appearing in the claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for determining stress and strain associated with a surface, said apparatus comprising:
   light source means to provide a light beam for illuminating said surface;
   optical data receiving means for sensing a reference speckle pattern and a succeeding speckle pattern produced by a reflected light source reflected from an illuminated area of said surface when undergoing deformation, said optical data receiving means further serving to digitize signals provided by said reflected speckle patterns; and
   computation means for mathematically analyzing the amplitude of said digitized signals to determine displacement between the speckle pattern reflected from the surface in a reference state and the speckle pattern reflected from the surface when undergoing deformation and thereby to determine stress and strain associated with said surface.

2. The apparatus for determining stress and strain associated with a surface as defined in claim 1, wherein said computation means includes a computer programmed to calculate said stress and strain associated with said surface based on said displacement.

3. The apparatus for determining stress and strain associated with a surface as defined in claim 2, wherein a monitoring means is included in combination with said computer so as to permit a visual viewing of a laser speckle pattern or fringe pattern associated with said surface.

4. The apparatus for determining stress and strain associated with a surface as defined in claim 3, wherein a display means is provided so that stress and strain calculations computed by said computer may be made readily accessible to a user.

5. The apparatus for determining stress and strain associated with a surface as defined in claim 4, wherein said light source means, said optical data receiving means, said computation means, said monitoring means and said display means are all contained in one integral unit.

6. The apparatus for determining stress and strain associated with a surface as defined in claim 5, wherein said light source means includes a laser.

7. The apparatus for determining stress and strain associated with a surface as defined in claim 6, wherein said optical data means includes the use of an optical data digitizer.

8. The apparatus for determining stress associated with a surface as defined in claim 7, wherein an electro-optic or other range indicating device is used to determine the distance between said digitizer and the surface being examined.

9. The apparatus for determining stress and strain associated with a surface as defined in claim 3, wherein said monitoring means includes a television monitor.

10. The apparatus for determining stress and strain associated with a surface as defined in claim 4, wherein said display means includes a visual display.

11. The method of correlating speckle pattern displacement reflected from a surface undergoing deformation, said method including the steps of utilizing a light source means for illuminating said surface with a light beam;

using an optical data digitizer for sensing a speckle pattern produced by at least a portion of said light beam being reflected from said surface when in a reference state, forming a signal in said optical data digitizer in response to said sensing of said reflected speckle pattern when the surface is in a reference state, using the optical data digitizer for sensing a subsequent speckle pattern produced by at least a portion of said light beam being reflected from said surface when undergoing deformation;

forming signals in said optical data digitizer in response to said sensing of said succeeding speckle patterns; and providing the amplitude of said signals to a computation means for correlating displacement of said speckle patterns.

* * * * *